(No Model.)

W. M. BARNES.
SPINDLE FOR VEHICLE AXLES.

No. 523,506. Patented July 24, 1894.

Witnesses:
L. C. Hill.
A. L. Hough.

Inventor:
William M. Barnes,
by Franklin H. Hough
Atty.

UNITED STATES PATENT OFFICE.

WILLIAM M. BARNES, OF CIRCLEVILLE, OHIO.

SPINDLE FOR VEHICLE-AXLES.

SPECIFICATION forming part of Letters Patent No. 523,506, dated July 24, 1894.

Application filed April 24, 1894. Serial No. 508,830. (No model.)

*To all whom it may concern:*

Be it known that I, WILLIAM M. BARNES, a citizen of the United States, residing at Circleville, in the county of Pickaway and State of Ohio, have invented certain new and useful Improvements in Spindles for Vehicle-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicles, and it relates more particularly to the construction of the axle and in the attachment thereto of the spindle, and the invention has for its object to provide a simple and inexpensive spindle which may be quickly and easily attached to the axle by any inexperienced person without the necessity of taking the running-gear of the vehicle apart.

To this end and to such others as the invention may pertain, the same consists in the peculiar features of construction of the spindle, and the combination, arrangement and adaptation of parts, all as more fully hereinafter described, shown in the accompanying drawings and then specifically defined in the appended claim.

The invention is clearly illustrated in the accompanying drawings, which, with the letters of reference marked thereon form a part of this specification, and in which drawings—

Figure 1:
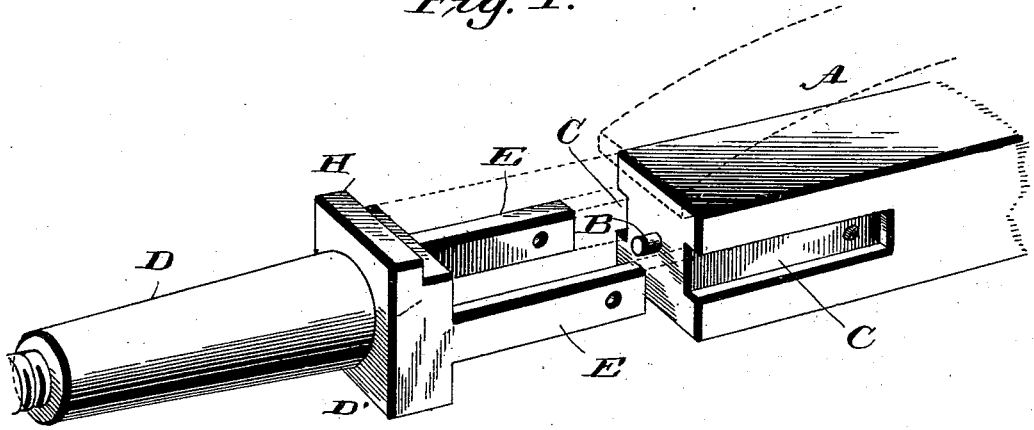
Figure 2:
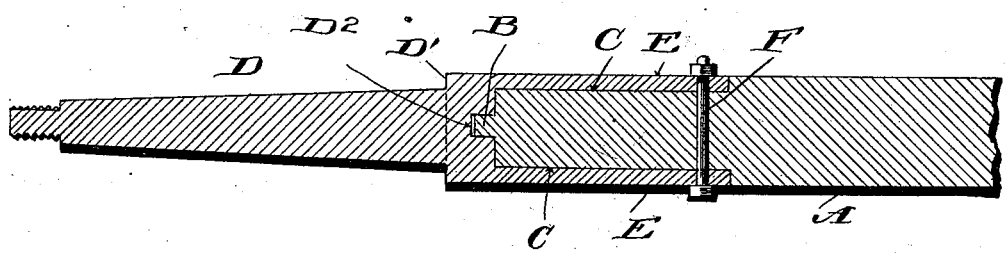

Figure 1 is a perspective view of the end of the axle of a vehicle, with my improved spindle detached but in its relative position. Fig. 2 is a vertical longitudinal section through the end of the axle with the spindle attached thereto.

Reference now being had to the details of the drawings by letter, A designates the end of a vehicle axle, which is provided at its extreme end with a short metallic post or lug B, and upon its opposite sides the axle is provided with longitudinal recesses C, C.

The spindle D is provided at its inner end with a solid, enlarged portion D', having an opening D² to receive the lug B upon the end of the axle. The inner end of the spindle is also provided with arms E, E, upon opposite sides, which arms engage the recesses C, C upon the axle, when the spindle is secured thereto, the parts being secured together by means of bolts F, passed through openings in the said arms and axle.

It will be at once evident that a spindle such as I have shown and described can be readily and easily secured to the axle, no special skill, and the use of few tools being required. The arms extending from the spindle in connection with the metallic lug at the end of the axle, together afford sufficient strength to insure against accidental detachment of the parts, and the arms being flush with the outer face of the axle, serve the purpose for which they are intended, without detracting from the appearance of the axle.

The upper edge of the inner end of the skein, is provided with an upwardly extending lug H, against which the end of the crossbar or strip of wood above the axle bears, as I have indicated in dotted lines.

Having thus described my invention, what I claim to be new, and desire to secure by Letters Patent, is—

The combination with the axle, carrying at each end a lug B, of a solid metallic skein D having shoulders D' and integral extensions E adapted to be secured in recesses on opposite sides of the axle, and the stepped portion H adapted to abut against the end of the axle, and the end of the wooden bar seated on the said axle, all substantially as shown and described.

In testimony whereof I affix my signature in presence of two witnesses.

WILLIAM M. BARNES.

Witnesses:
 B. F. BARNES,
 M. J. BARNES.